United States Patent [19]
King

[11] Patent Number: 5,994,897
[45] Date of Patent: Nov. 30, 1999

[54] FREQUENCY OPTIMIZING METAL DETECTOR

[75] Inventor: Kevin James King, Little Canada, Minn.

[73] Assignee: Thermo Sentron, Inc., Coon Rapids, Minn.

[21] Appl. No.: 09/023,140

[22] Filed: Feb. 12, 1998

[51] Int. Cl.[6] .............................. G01V 3/08; G01R 33/14
[52] U.S. Cl. .................... 324/236; 324/228; 324/328; 324/232
[58] Field of Search ..................... 324/228, 232, 324/233, 236, 239, 326, 327, 328, 329, 234

[56] References Cited

U.S. PATENT DOCUMENTS

| | | | |
|---|---|---|---|
| 2,393,717 | 1/1946 | Speaker | 324/236 |
| 3,686,564 | 8/1972 | Mallick, Jr. et al. | 324/232 |
| 3,961,238 | 6/1976 | Randolph, Jr. | 324/327 |
| 3,986,104 | 10/1976 | Randolph, Jr. | 324/327 |
| 4,255,710 | 3/1981 | Weber | 324/328 |
| 4,818,936 | 4/1989 | Kemlo | 324/232 |
| 4,975,646 | 12/1990 | Llamas Llamas et al. | 324/232 |
| 5,160,885 | 11/1992 | Hannam et al. | 324/202 |

*Primary Examiner*—Jay Patidar
*Attorney, Agent, or Firm*—David George Johnson

[57] ABSTRACT

A metal detector (10) which uses a metallic test sphere (5) to pass with the product through the detector head (2) at periodic intervals. The frequency generator (21) which generates the signal sent to the oscillator coil (11) is capable of operating on numerous frequencies in the 50 kHz to 2 MHz range. The product is passed through the detector head (2), with and without the sphere (5) present, for each of the operating frequencies. The detected signal from the product and the product with metal is characterized for each of the operating frequencies. In this manner the frequency which produces the highest ratio of product with metal present signal to product signal without metal present can be identified. A second version of the metal detector (40) uses a frequency synthesizer (43) which may be rapidly scanned through a range of frequencies while the product is passing through the detector head (41). The signal produced by the product for each frequency can then be identified and stored in a controller (49), thereby establishing a threshold value for the product at each frequency. During a subsequent metal detection step, a signal above the threshold at any frequency indicates the presence of metal. A third version (63) of the metal detector simultaneously and continuously operates on two or more frequencies. When product passes through the search head 60, the amplitude and phase of the received signals (65) are measured and recorded for each of the operational frequencies. A controller (94) establishes threshold levels for the product. If any threshold for the product is exceeded at any frequency, metal is present.

10 Claims, 7 Drawing Sheets

FREQUENCY OPTIMIZING METAL DETECTOR

FIELD OF THE INVENTION

The present invention relates generally to the field of metal detection, and more particularly to the field of automated metal detection equipment particularly adapted for use in the food industry.

DESCRIPTION OF RELATED TECHNOLOGY

Metal detectors in the food industry typically radiate an electomagnetic signal having a single operating frequency in the range of fifty kilohertz to two megahertz. These detectors use phase sensitive synchronous detection in order to detect the metal in the presence of background noise. The background noise is typically composed of two sources. The first background noise is random, broad spectrum "white" noise which is picked up by the metal detector's receiver coils. The white noise originates from many sources, typically including electrical equipment operating nearby and from other stray, unshielded radio frequency radiation, as well as internal noise generated from the metal detection circuit itself. Interference caused by white noise is substantially reduced or eliminated by conventional methods of synchronous detection.

The second type of background noise is caused by the product which is actually under test by the metal detector. Metal detectors in the food industry are designed to detect both ferrous and nonferrous metals. The technology which permits the detection of both types of metal requires that the metal detector be sensitive to the conductivity of the metal. However, many of the products under test also possess some degree of electrical conductivity. While these products are not nearly as conductive as the metallic materials which are to be detected, the total volume and surface area of the product under test is usually orders of magnitude larger than the metal object which may imbedded within it.

The result is that the product signal received by the detector coils is larger than the signal produced by the presence of metal. A high ferrous content in the product can further increase the magnitude of the "product effect" signal.

Both the "white noise" and the "product effect" radiation can produce a signal from the product that has an amplitude as well as a discrete phase component. Phase sensitive detection is used to minimize or cancel the signal caused by the product. This phase reduction frequently reduces the magnitude of the signal produced from a metal object as well. Typically, the reduction in signal from the product is much greater than the reduction in signal magnitude caused by the metal, but in some instances due to the phase characteristics of the product and the metal, the metal signal may be very greatly reduced or even eliminated.

The operating frequency of the metal detector is usually selected depending on the product to be tested, rather than on the type of metal which is likely to be detected. The product effect signal is dependent on the operating frequency. Generally, the higher the operating frequency, the greater the magnitude of the product effect signal. Since the product effect signal is to be minimized, the tendency would be to select the lowest practical operating frequency. Unfortunately, the sensitivity of the metal detection is also dependent on the operating frequency. The lower the operating frequency, the less sensitive the detector is to the presence of metal. A further complicating factor is that the relationship between the magnitude of the metal signal and different operating frequencies is not linear. Different types of metal have different characteristic response curves. Finally, the product itself will also have its own unique frequency vs. signal magnitude relationship.

When using phase detection technology in a metal detector, the goal is to have a large difference between the phase of the product effect signal and the phase of the metal signal. A large phase difference means that the reduction of the product effect signal will have a minimal effect on the magnitude of the metal signal.

The phase response versus frequency relationship is not identical for food products and metallic materials. Lowering the operating frequency will decrease the signal from the food product as well as from the metal. Without specific testing of both the product and the metal it is not possible to determine the relative or absolute rates of signal magniude reduction vs. frequency.

In those cases where the food product signal magnitude decreases at a faster rate than the metal signal magnitude for a given reduction in operating frequency, a decrease in frequency may increase the sensitivity of the detector to metal. However, if phase detection is used, and because phase relationships are dependent on frequency, an increase in the metal signal to product effect signal ratio may actually decrease the sensitivity of the detector to metal if the phase of the metal signal moves closer to the phase of the product signal as the operating frequency is reduced. The particular phase detection algorithm being used may reduce or substantially eliminate more of the metal signal than would be lost by an increase in operating frequency.

The effects of changes in operating frequency are well known. However, methods of prediction as to which frequency will be the optimum for a particular situation are not well known. Previous attempts to set a metal detector to the optimum frequency have been limited to setting the frequency to one that has worked well previously on the same or similar type of product. Unfortunately, small differences in product can make fairly large differences in the successful operation of the metal detector. In order to get the detector to operate at the best frequency, the detector has been tuned to the desired frequency and a sensitivity to metal test must then be performed. This test is then repeated at higher and lower frequencies to ensure that the proper frequency has been chosen. In practice, such tests are time consuming and are therefore conducted only occasionally. The tests often show that by changing the operating frequency, sensitivity to one type of metal may be enhanced but sensitivity to other types of metal may be decreased. The selection of operating frequency will be a compromise because of these characteristics.

Frequency selection is dependent on the type of product being tested. In many production lines the detector is required to operate effectively with many different sizes and types of products. The operating frequency selected for one product is almost certainly not the best frequency for all of the other products. The sensitivity of the detector to the presence of metal is compromised when the frequency selected for one product is used to test a for the presence of metal in a different product having different product effects.

The earliest example of a "multiple frequency" metal detector is disclosed in U.S. Pat. No. 2,393,717, issued to Speaker. The Speaker device utilizes a fundamental frequency and its harmonic to produce a more readily detectable audio beat frequency in the presence of metal. More specifically, the frequency of the oscillator changes when metal is in the proximity of the oscillator coil due to a change in the inductance in the coil. The operator interface is a speaker. When the oscillator frequency changes, the output frequency of the mixer changes, resulting in a different audio frequency which can be heard by the user of the device. No guidance is given as to the selection of the actual frequency to be used except that it is in the range of 25 kHz to 40 kHz.

Another early detector is disclosed in British Patent No. 1,056,768, issued to Murch. The Murch document states that buried cables carrying alternating current can be detected by sensing the radiated signal at the power supply frequency, or a signal may be injected into the cable at a frequency of 1.0 kHz to 1.5 kHz. No guidance is given as to why one frequency would be chosen instead of another. A true multifrequency metal detector is disclosed in U.S. Pat. No. 3,686,564, issued to Mallick, Jr. et al. The Mallick device is designed to detect the presence of firearms concealed on a person passing through a large detector head. A low frequency (0.1 kHz) and a high frequency (1.0 kHz) are transmitted and detected simultaneously. By comparing the amount and type of each signal detected, the presence of a threshold amount of iron can be detected.

A metal detector that is designed to distinguish between aluminum and gold is disclosed in U.S. Pat. No. 3,961,238, issued to Randolph, Jr. This detector actually radiates only a single frequency, but contains two resonant detector circuits tuned to separate frequencies. The preferred operating frequency for this arrangement is 15.581 kHz. Randolph, Jr. is also the inventor of related U.S. Pat. No. 3,986,104, which utilizes two oscillators operating on two separate frequencies. The two oscillator outputs are sent to a mixer having an output which is fed to a single search or transmitting coil. The reflected signal is fed back to each individual oscillator, and the behavior of each oscillator is affected differently depending on the type of metal sensed. The first oscillator operates at a frequency of 2.134 kHz and the second oscillator operates at a frequency of 11.054 kHz.

A metal detector using several different search frequencies is disclosed in U.S. Pat. No. 4,255,710, issued to Weber. The Weber device uses search frequencies of approximately 50 kHz, and connects each individual oscillator to a separate loop antenna. By mixing harmonics of the search frequencies and listening to the resultant beat frequencies, the location of a metal object with respect to the individual search heads can be inferred to some extent.

All of these devices use multiple frequencies as part of a metal detection scheme. None, however, suggest a method of choosing the optimum frequency for each particular object which is being tested for the presence of metal.

SUMMARY OF THE INVENTION

The present invention addresses some of the problems associated with prior art devices by providing a method and apparatus for automatically selecting the best frequency for conducting metal detection. One feature of the present invention is an improvement of the technology described in U.S. Pat. No. 5,160,885, issued to Hannam et al., a technology that is often referred to by the trademark "AuditCheck". The Hannam et al. patent discloses a guide or conduit which is oriented so that its longitudinal axis passes through or near the sensing assembly of a metal detector. A test piece which includes an object having known parameters is passed through the guide and serves to verify that the metal detector is functioning properly.

In the present invention, a detector is used which is capable of operating on,at least two different frequencies. A learning or optimization process is begun during which the type of product to be tested is passed through the detector while the detector is operating at a first frequency. The detector phases out or otherwise cancels the product effect signal. Test spheres are then passed through the detector head using the "AuditCheck" system and the signals resulting from the sphere(s), the product, and the combination of the product and the sphere(s) are analyzed and recorded The detector is then switched to operate at a second frequency, and the calibration and testing process is repeated, with the results being analyzed and recorded. The next detector operating frequency is then selected and the process repeated until all of the available detector operating frequencies have been tested, analyzed and recorded. The results of the tests performed at each discrete frequency are then compared to each other. The relative ratio of the signal amplitude of the product with metal present to the signal amplitude of the product without metal present is then calculated for each detector frequency. The optimum frequency is that frequency which produces the highest ratio of signal with metal present to signal without metal present.

A second embodiment of the present invention utilizes a detector which is capable of switching operating frequencies at a rapid rate. When product passes through the sensing head, the detector operates at a first frequency, detects the signal levels at that frequency, switches to a second frequency and detects the signal levels at the second frequency. The detector continues to switch to successive frequencies and detect signal levels until the detector returns to the first frequency, when the scanning may be repeated. The scanning rate is sufficiently high that the product passing through the sensing head does not move appreciably during one or more complete cycles of the frequency scan. This permits all of the product that passes through the detector to be inspected using all of the operating frequencies. The signal produced by each frequency is analyzed and recorded, and establishes a threshold product effect signal. If this threshold is exceeded, then the metal is present.

A third embodiment of the invention utilizes a detector which operates at two or more frequencies continuously. When the product passes through the detector aperture, the signal level and the phase of the signals are measured and recorded on each of the operational frequencies. The signals from the product at each of the frequencies are analyzed. Phase out methods may be used at each of the frequencies to reduce product signal. The signals from the product are used to establish thresholds for the product. If the threshold for the product at any frequency is exceeded, then metal is present. These and other features of the present invention will subsequently be described in greater detail.

DETAILED DESCRIPTION OF THE PREFERRED EMBODIMENTS

Referring to FIGS. 1, 2, 3 and 5, a metal detection apparatus 10 has a yoke or search head 2 comprising a solid former having a first wire oscillator coil 11 and a second wire receive coil 12 wrapped around it, the whole being encapsulated in an epoxy resin and housed in a stainless steel casing. The receive coil 12 is actually composed of two discrete coils wired in series opposition. A conventional conveyor belt 1 for transporting nominally nonmetallic materials or other product (not shown) passes through the aperture 13 defined by yoke 2. The yoke thereby provides an electromagnetic field which surrounds the materials as they pass along the conveyor 1. Any transient distortion of the electromagnetic field which will occur if metal or other conductive material is present among the nonmetallic materials generates a warning signal or other action of a desired type.

The present invention is concerned with selecting the proper operating frequency of the oscillator coil 11 by a method which is automatic and repeatable. For this purpose, a nonmetallic guide tube 3 or other suitable guide housing made, for example, of nylon or other nonconductive material is securely fastened to the yoke 2. The guide tube 3 carries internally a nonmetallic slug 4 in which is imbedded a test piece 5 typically formed as a sphere. The metal sphere 5 is usually composed of the type of metal which the user is most concerned about detecting. In the food industry, the test piece 5 would probably be stainless steel, while pharmaceutical manufacurers might use a brass sphere.

The guide tube 3 passes through the electromagnetic field surrounding the yoke 2. One end 6 of the tube is on one side of the yoke 2, while end 14 is on the opposite side of the yoke 2. When the slug 4 is stationary, the distortion of the electromagnetic field is a constant which can tuned out or nulled by the controller circuit 15. However, movement of the slug 4 within the tube 3 causes a distortion of the electromagnetic field which does generate a response. Data processing circuitry 37 sends and receives information such as the speed of conveyor 1 and the position of the air valves 17, 18 and 19 to and from the controller 15 along signal path, 39.

The slug 4 can move freely along the guide tube 3 from end 6 to end 14, and is caused to move along this path by the pressure of air introduced through tubes 7 and 8. A conventional air supply 16 provides pressurized air to valve 17 to provide a means of selecting whether tube 7 or tube 8 is pressurized. When the slug 4 moves from end 6 to end 14 of the guide tube 3, the slug moves from one side of the yoke 2 to the other. The normal rest position of the slug 4 is end 6 of guide 3. Upon the application of air pressure first through air flow valve 18 and then through air flow valve 19, the slug 4 will travel from end 6 to end 14 and then from end 14 to end 6, carrying the slug from one side of the yoke 2 to the other and then back again. As the slug 4 moves it generates corresponding responses in the detection circuits 20.

Figure 4:
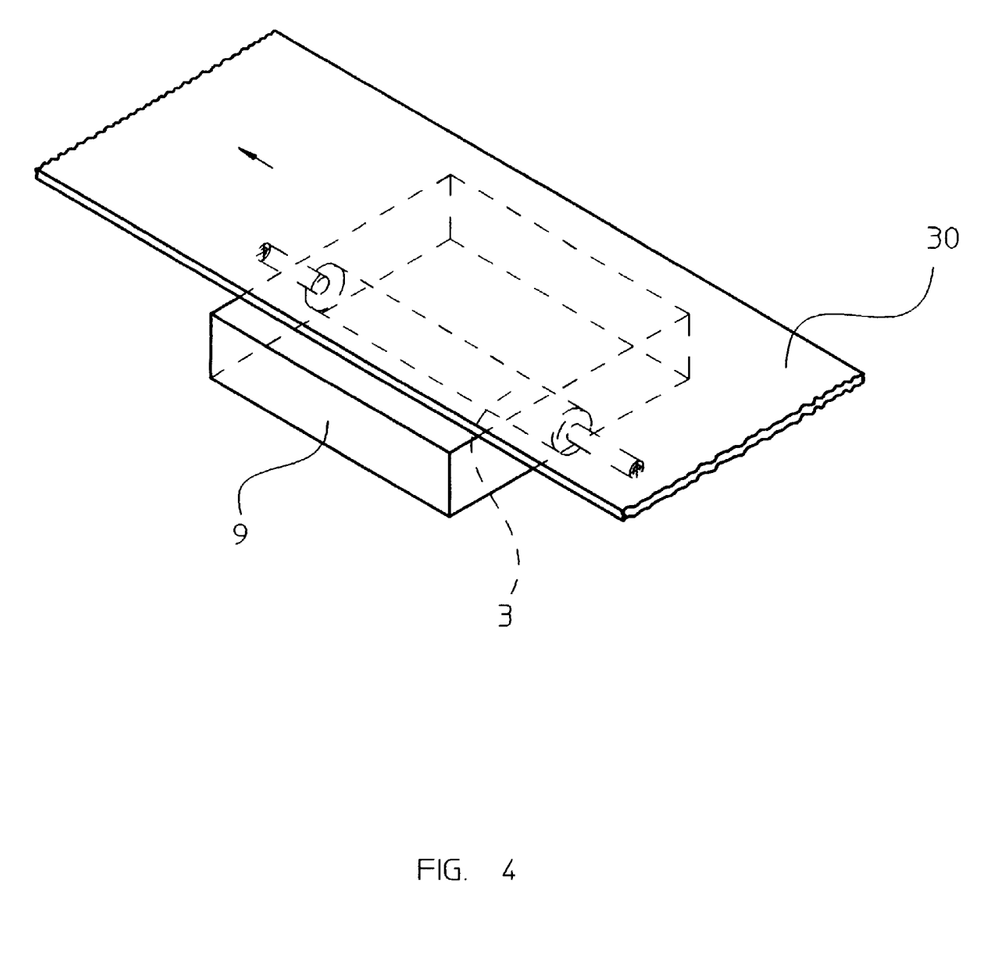
FIG. 4 is a perspective view of an alternate embodiment of a metal detecting apparatus built according to the principles of the present invention.

FIG. 4 shows the same guide tube 3 mounted in an alternative manner in which the electromagnetic field producing coil and field detecting coils are built into a relatively thin rectangular solid 9. The conventional product conveyor belt 30 runs just above the rectangular solid 9 so that an electromagnetic field adjacent to the conveyor belt appears to emanate at right angles to the belt. The guide tube 3 is again molded into the solid 9 and extends parallel to the longitudinal axis of the conveyor belt 30 with its ends on opposite sides of the electromagnetic field. The case housing the detector must be made of metal for shielding purposes, since any movement of metal under or around the detector would otherwise be sensed.

Figure 1:
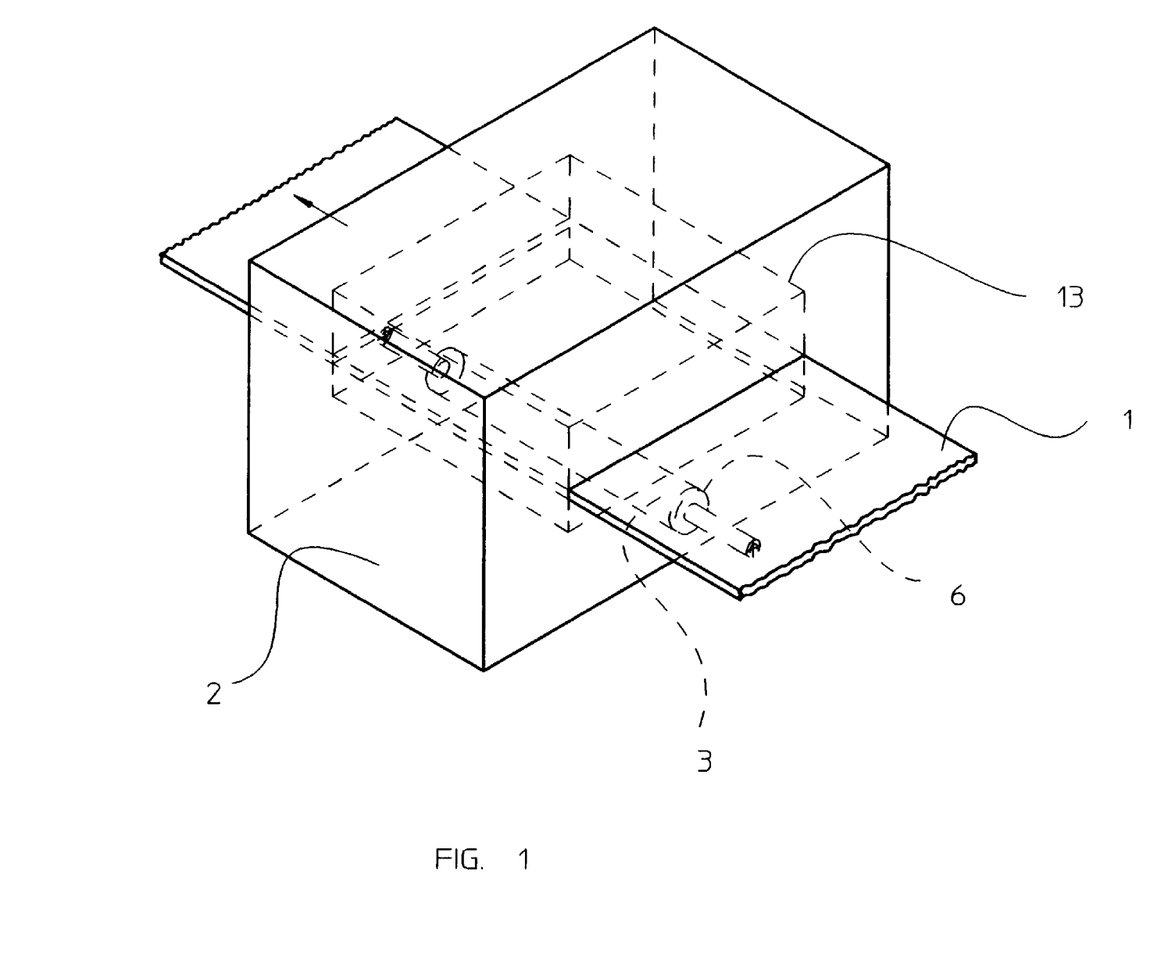
FIG. 1 is a perspective view, by way of example, of a conveyor belt passing through a metal detector sensing head as used in the present invention.
Figure 2:
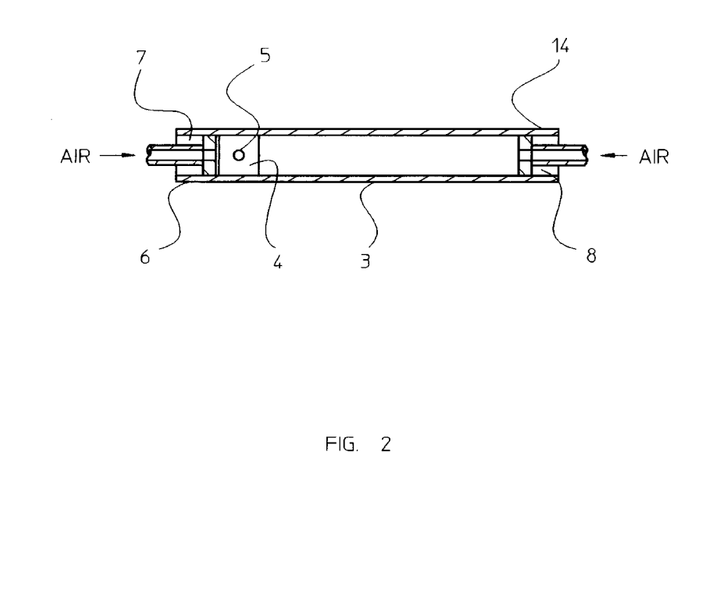
FIG. 2 is a sectional side elevation of a portion of the apparatus of FIG. 1.
Figure 3:
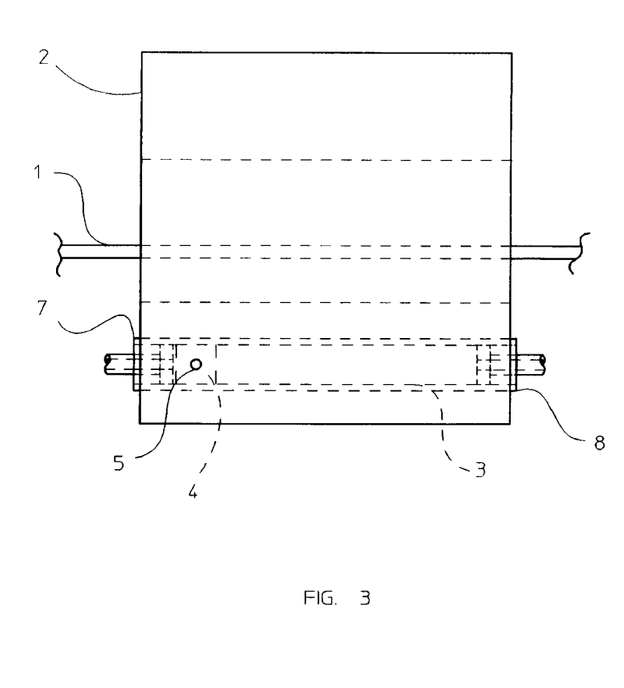
FIG. 3 is a sectional view through the apparatus of FIG. 1.

Regardless of the particular arrangement of the tube 3 with respect to the conveyor belt 1 or 30, the operation of the circuitry is the same. A frequency generator 21 is used which is capable of operating on a number of discrete frequencies.

Figure 5:
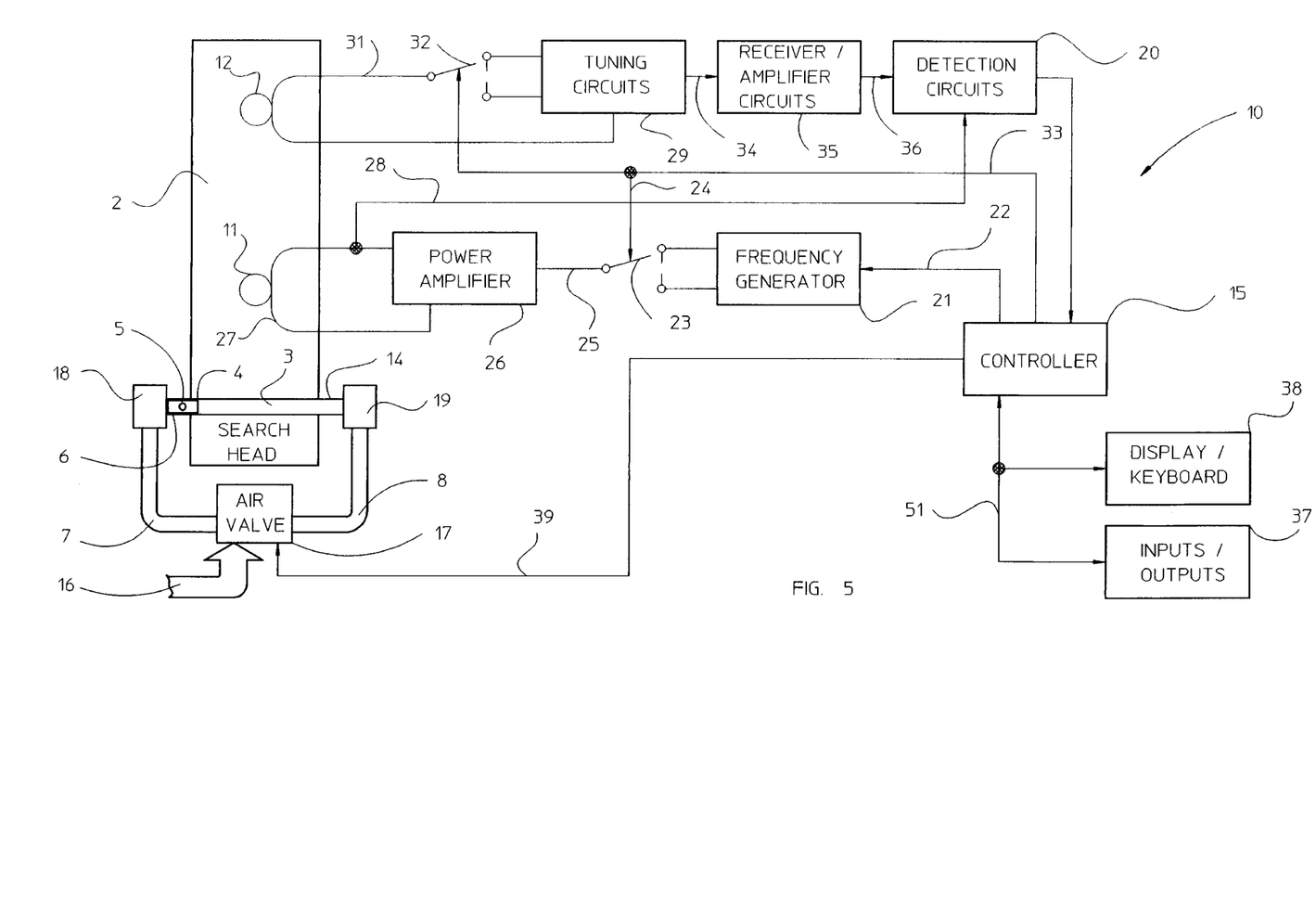
FIG. 5 is a schematic diagram of a multiple frequency metal detecting apparatus built according to the principles of the present invention.

The controller 15 is interconnected to frequency generator 21 by signal path 22. In operation, controller 15 operates frequency selector switch 23 via signal path 24. While switch 23 as illustrated is electromechanical, other forms of switching, such as purely solid state, may also be utilized. A first frequency is chosen by controller 15 and the output of the frequency generator 21 is sent to power amplifier 26 along signal path 25. The amplified first frequency signal is sent to oscillator coil 11 along signal path 27, and is also sent as a reference signal along signal path 28 to detector 20. A product (not shown) is passed through the head 2 and a product signal is sensed by receiver coils 12.

A "front end" tuning circuit 29 receives the output signal 31 from receiver coils 12. A switch 32 is operated by controller 15 along signal path 33 in conjunction with switch 23 so that the receiver front end 29 is always tuned to the same approximate frequency as the frequency generator 21. An alternate design can incorporate a wide band receiver front end which would eliminate the need for the tuning circuits. The tuning circuit output signal 34 is sent to amplifier 35 and the amplified signal 36 serves as the second input to detector circuit 20. The detection circuits are typically phase synchronous detection circuits. A wide variety of methods well known to those having ordinary skill in this field can be utilized to perform this function. Analog multipliers such as the MPY600 and the AD835 may be used, as well as modulator/demodulator integrated circuits such as the MC1496/MC1596 or the AD630. An alternate form of synchronous detection can be accomplished by the use of analog switches or discrete transistors. Yet another method of synchronous demodulation is to incorporate a high speed analog to digital converter to directly digitize the radio frequency signal within detector circuit 20. A suitable program stored within the controller 15 and selected by display/keyboard circuitry 38 processes the information from the detector circuit 20 to determine the characteristics of the product signal.

These characteristics include information about the product signal amplitude and phase. If one knows the phase of the product signal, the product signal amplitude may be deduced using well known phase out techniques. The residual signal remaining after the phase cancellation procedure can be used to set the threshold level for the product. Any signal exceeding this threshold would be a presumptive indication of metal in the product under test.

The controller 15 then operates air valve 17 via signal path 39 to cause the test sphere 5 along with the product under test to pass through detector head 2. The coontroller 15 switches air valve 17 to cause the test shuttle 4 with test sphere 5 to quickly return to the original starting point. For each passage of the sphere through yoke 2, the controller 15 and circuitry 37 process the signal from the passage of the product and metal in the same manner the product alone was processed. The inclusion of metal with the product will alter the signal characteristics. The primary effect is that the metal will increase the phase out signal strength. The controller 15 records this signal from the metal and product passage as well as the signal from the product alone. The same sphere may be passed again through the detector head 2. Alternatively, a selectable stack (not shown) of spheres may be used in which spheres composed of different metals and sizes are available. The controller 15 then selects a second operating frequency and the product is passed through head 2. The product effect signal produced at this second frequency is analyzed and recorded by controller 15. The test sphere 5 is sent through yoke 2 along with the product and its effect is analyzed and recorded at the second frequency.

The controller 15 selects a third frequency and the product is passed through head 2, producing a product effect signal for the third frequency. The test sphere 5 is then sent through yoke 2 with the product to produce a metal calibration signal at the third frequency. In a sequential fashion, the aforementioned product effect and test sphere data is produced, analyzed and recorded at each of the frequencies at which the frequency generator is capable of operating.

The results of the aforementioned test sequences produce two meaningful data points for each frequency selected, which can be combined to create a ratio of the product effect signal without the metal test sphere present to the product effect signal with the metal test sphere present. This unitless figure of merit will be highest at the optimum operating frequency, which is that frequency at which all subsequent similar product should be tested for the presence of metal. After all the test sequences have been performed, the detector calculates the ratio to determine the best operating frequency. Once the frequency has been determined, the detector switches to that operational frequency and, using the parameters already stored in memory for that frequency, starts operational metal detection.

Many variations of the aforementioned system are possible. For example, a number of different guide tubes 3 could be present within the yoke 2 or aperture 13 simultaneously. This would permit the automated testing of numerous spheres, either of different compositions or different masses. The latter test would be useful for determining the minimum or threshold level of metal which can be detected in the presence of a particular product. Further, the frequency generator could be made variable over a great many small increments. In this manner, the combination of sphere types and frequencies could be varied in an iterative fashion until the optimum frequency is determined.

Figure 6:
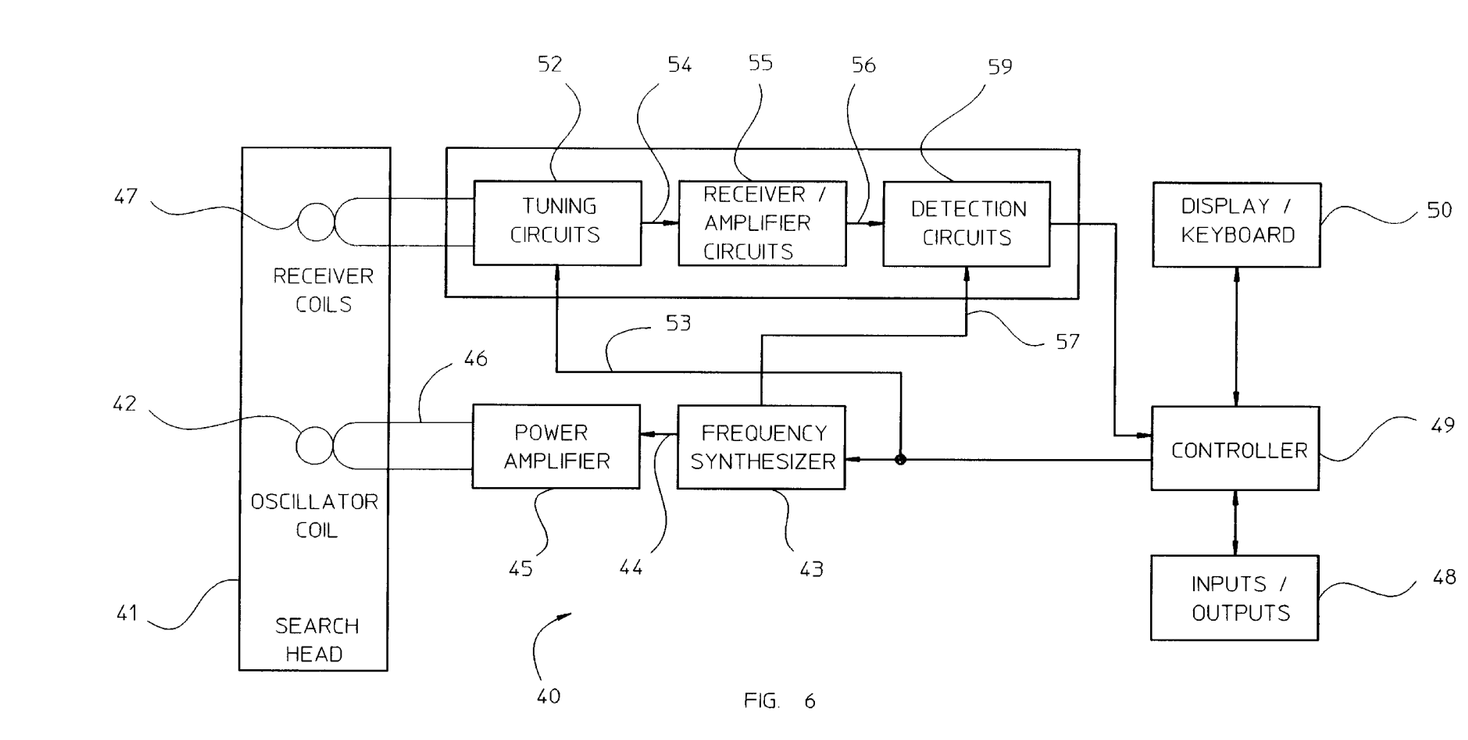
FIG. 6 is a schematic diagram of a second embodiment of a multiple frequency metal detecting apparatus built according to the principles of the present invention.

Referring now to FIG. 6, a second embodiment of the present invention can be understood. The metal detector 40 includes a search head 41. Within the search head 41 is an oscillator coil 42. The signal radiated by the oscillator coil 42 originates at frequency synthesizer 43, which is capable of operating over a wide range of frequencies in the range of 50 kHz to 2 MHz in steps of 1 kHz or less. The synthesizer output signal 44 is sent to a power amplifier 45 that is interconnected directly to the oscillator coil 42 via signal path 46. Adjacent to the oscillator coil 42 are series opposed receiver coils 47 which are capable of intercepting the magnetic lines of force emanating from the oscillator coil 42.

The specific operational mode of the metal detector 40 is selected through keyboard 50, which is interconnected to a controller 49, the controller 49 typically being a microprocessor combined with suitable memory, device drivers and its associated software. The controller 49 also receives data such as conveyor and product position from input devices 48.

In operation, the synthesizer 43 is capable of switching frequencies at a high rate, such as 10 kHz. The switching frequency is well below the lowest frequency actually generated by the synthesizer 43, which means that the synthesizer output signal 44 completes a large number of entire cyclic periods before the synthesizer frequency switches to the next frequency. The rate at which frequencies are changed by synthesizer 43 is chosen to be high enough that all of each product under test will be subjected to all of the frequencies which are to be scanned. The rate at which the frequency is changed will be high enough that the product passing through the test head 41 does not move appreciably during one or more cycles of the frequency switching. This will ensure that all of the product is inspected by each of the operational frequencies.

At each discrete frequency selected by synthesizer 43, the receiver front end tuning circuits 52 are adjusted to receive that particular discrete frequency by controller 49 acting along signal path 53. As mentioned earlier, an alternate design (not shown) could incorporate a wide band receiver front end, which would not require the tuning circuits 52. The front end output signal 54 is sent to amplifier 55 which produces an amplified output signal 56. A detector 59 receives the amplified signal 56 as well as reference signal 57 from the synthesizer 43. By using techniques well known to those having ordinary skill in this field, the phase of amplified signal 56 can be synchronously demodulated using reference signal 57 from the synthesizer 43. The detector can determine the product effect signal, both amplitude and phase, at that frequency. The detection circuits are typically phase synchronous detection circuits. A wide variety of methods can be utilized to achieve this end.

Analog multipliers such as MPY600 or AD835 may be used as well as modulator/demodulator integrated circuits such as the MC1496/MC1596 or AD630. An alternate form of synchronous demodulation may use analog switches or discrete transistors. Another method of synchronous demodulation is to incorporate a high speed analog to digital converter to directly digitize the radio frequency signal within detector 59. Any of these techiques will permit the phase and amplitude of the signal to be determined.

When the phase of the product has been determined using the above described phase sensitive techniques, the signal from the product may be recovered by well known phase out techniques. After conducting such an analysis, the detector 59 can determine a threshold signal level for each frequency. A signal level above the threshold would then be indicative of the presence of metal. However, at this point the detector is simply determining what product effect signal is present at each frequency. Upon completion of learning the product effect signal for each frequency, the detector 41 is then enters an actual metal detection mode.

In the metal detection mode, the synthesizer 43 and the detector 59 cycles through each of the availble frequencies as was just described for the product effect learning process. The detector 59 acquires a signal level from the product at each of the operating frequencies. The signal from the product for each of the frequencies is filtered and processed by well known means in order to further enhance and characterized the signal. The signal processing step may include a phase comparison at each of the synthesizer frequencies or a more sophisticated signal processing method. The signal 56 from the product is then compared to the previously learned signal from the product for each of the operating frequencies. If the signal 56 from the product exceeds the threshold established for any frequency then metal is present in the product.

This second embodiment of the metal detector offers several advantages over the first insofar as no test sphere is requires to pass through the detector head during the product effect learning process. The second embodiment also provides a higher sensitivity to all types of metals. Different types of metals have different responses at different frequencies. Since the detector 40 is effectively operating at multiple frequency ranges, the response to all types of metals is improved.

Figure 7:
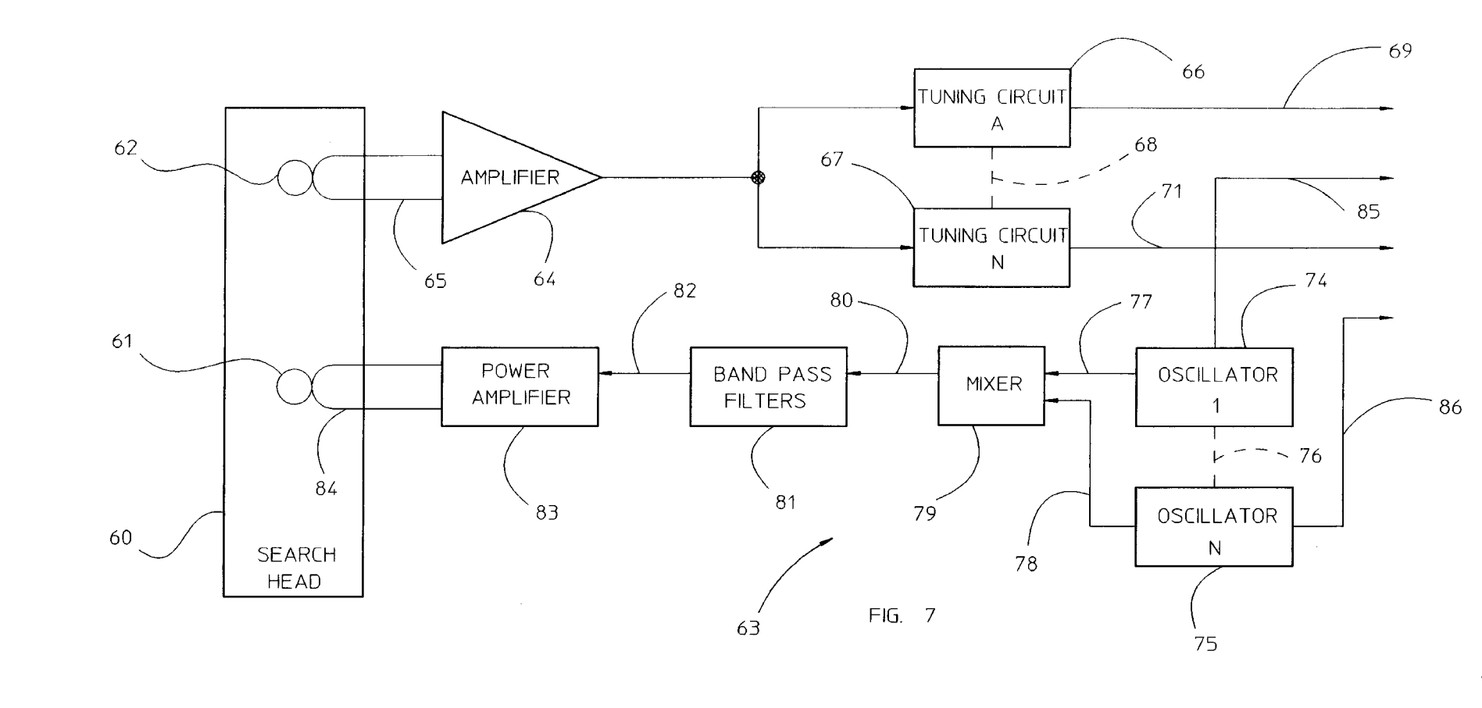
FIG. 7 is a schematic diagram of a portion of a third embodiment of a multifrequency metal detector built according to the principles of the present invention.
Figure 8:
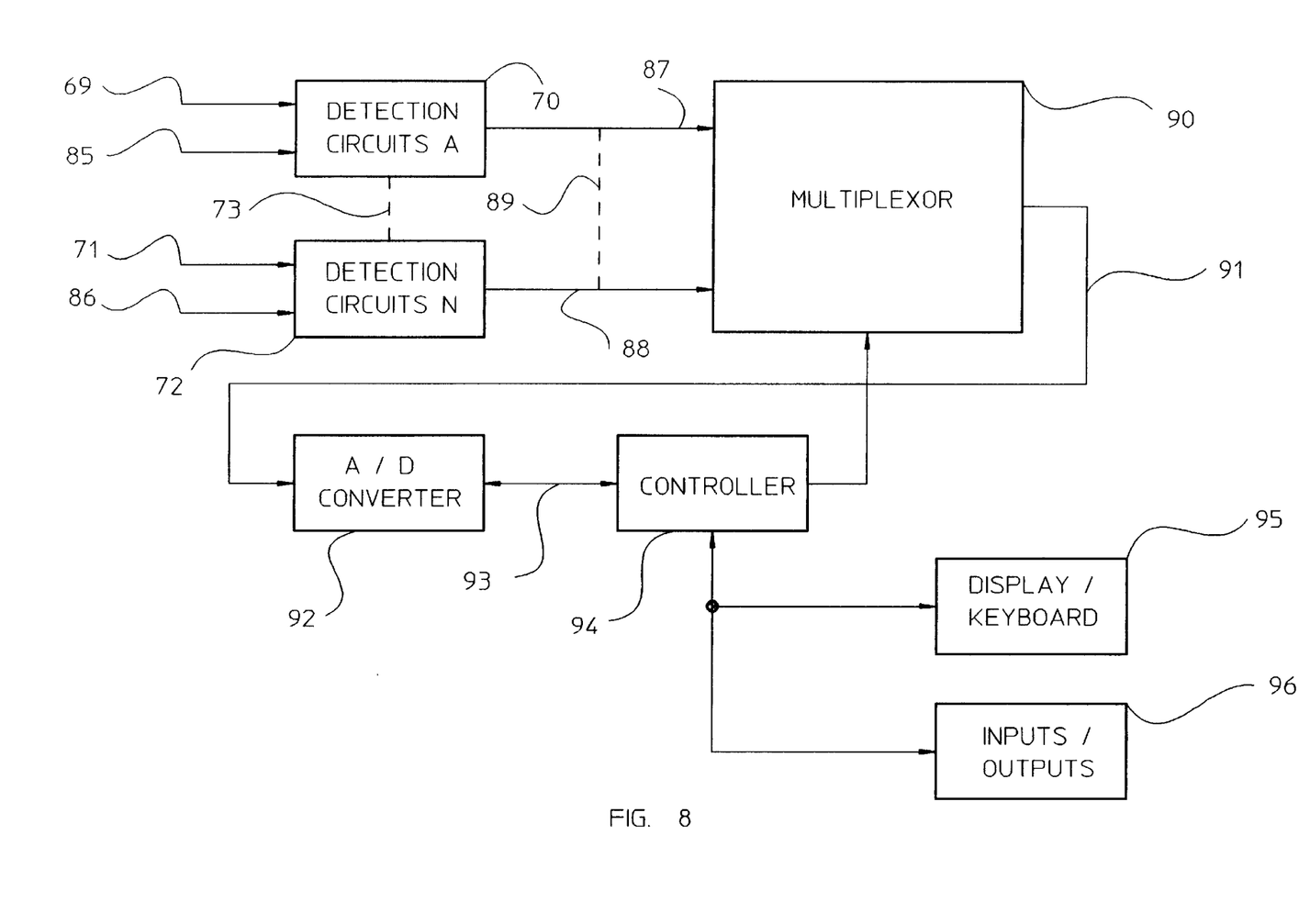
FIG. 8 is a portion of the schematic diagram of the third embodiment of the present invention which, when joined with the diagram of FIG. 7, represents a complete schematic diagram of the third embodiment of the multifrequency metal detector.

Referring to FIGS. 7 and 8, a third embodiment 63 of the multifrequency metal detector can be understood. A search head 60 includes a transmitting coil 61 and a pair of series opposed receiving coils 62. The receiver coils 62 are interconnected to a broad band amplifier 64 via signal path 65. The receiver coils 62 are simultaneously receiving signals from the transmitting coil 61 on at least two frequencies, the first frequency being labelled as "A" and the last frequency being labelled as "N". In practice, two or three frequencies are sufficient for most applications. A separate tuning circuit is provided for each frequency, such as tuning circuit 66 for frequency "A" and tuning circuit 67 for frequency "N". The path 68 indicates the possibility of adding additional tuning circuits for additional frequencies "A+1", "A+2", etc. The output signal 69 from tuning circuit 66 (frequency "A") is an input to a first detector 70, while the output signal 71 from tuning circuit 67 is an input to second detector 72. The path 73 represents the location of other discrete detectors for additional frequencies, each discrete frequency having its own individual detector. Similarly, each frequency has its own individual oscillator, with frequency "A" being generated by oscillator 74 and frequency "N" being generated by oscillator 75. Path 76 indicates the location of additional oscillators for additional discrete frequencies. The output signal 77 from first oscillator 74 and the output signal 78 from last oscillator 75 are combined in mixer 79. The mixer 79 produces an output signal 80 that includes the original frequencies ("A" and "N") as well as the sum and difference of those frequencies. The output signal 80 is the input to bandpass filter assembly 81 which removes the spurious image frequencies produced by the mixing process. The output signal 82 of the bandpass filter 81 is amplified by amplifier 83 and sent along signal path 84 to the oscillator coil 61.

A reference signal 85 is sent by oscillator 74 to the first detector 70, and a reference signal 86 from oscillator 75 serves as an input to the last detector 72, thereby permitting each detector to sense the presence of any phase shift in the received signal. The output signal 87 from first detector 70 as well as the output signal 88 from the last detector 72 (as well as any signals 89 from additional detectors 73) are sent to multiplexor 90, which selectively outputs a signal 91 representative of each discrete frequency "A" through "N" to analog to digital converter 92.

The digital bus 93 permits communication between the A/D converter 92 and controller/microprocessor 94, which is programmed to analyze and store information concerning characteristics of the received signal by methods known to those having ordinary skill in this field. Data sent to and received by the controller 94 can be communicated via keyboard/display 95 as well as other suitable input/output devices 96.

In operation, the controller 94 is set to operate on the selected two or more frequencies. The number of frequencies as well as the frequencies themselves are dependent on the product under test and can be selected based on experience gained from single frequency metal detectors already known in this field. The selection of the specific frequency is not extremely critical. In general, a dry product may require a medium and a high frequency (500 khz and 2 Mhz, for example), while a wet, conductive product would be better served with a low and a medium frequency (60 kHz and 300 kHz, for example).

The product is passed through the detector head 60 while the controller 94 is in a "learning" mode. The controller 94 learns the product characteristics at each of the operating frequencies. The product may be phased out, if desired, at each of the operating frequencies using well known phase out techniques. The product signal characteristics are acquired during the learning process. After the learning process is complete, the controller 94 calculates and sets threshold signal levels for the product signal for each of the frequencies used.

In normal operation of the detector 63, the controller 94 compares the signal received from the product to the threshold signals calculated during the learning process. If the controller employed a phase out mode to determine the threshold signal levels, the same phase out algorithm is used for actual metal detection as well in the normal operation mode. If any of the received and processed signals from the product under test exceeds any of the threshold signal levels, a metal detection indication is given at display 95.

Various other modifications may be made to the specific embodiments of the invention described herein without departing from the spirit and scope of the invention. Those skilled in this field will readily appreciate that numerous component substitutions, circuitry changes and frequency ranges may be employed to implement the present invention for specific uses.

I claim:

1. A metal detector, comprising:
   a. a frequency generator, the frequency generator being capable of sequentially generating a radio frequency signal at plurality of discrete frequencies;
   b. an oscillator coil, the oscillator coil being interconnected to the frequency generator so as to sequentially radiate a radio frequency signal at a plurality of discrete frequencies;
   c. a receiver coil, the receiver coil being located within the electromagnetic field radiated by the oscillator coil, the receiver coil thereby receiving the sequentially radiated frequencies generated by the frequency generator;
   d. a detector, the detector being interconnected to the frequency generator and the receiver coil, the detector sequentially analyzing and characterizing disturbances in the electromagnetic field; and
   e. a controller, the controller being interconnected to the frequency generator and the detector, the controller determining and selecting the single discrete frequency at which the detector is most sensitive to disturbances in the electromagnetic field.

2. The metal detector of claim 1, further comprising:
   a. a test article, the test article having a known characteristic; and
   b. a guide, the guide confining the test article, the guide defining a path along which the test article can travel within the electromagnetic field.

3. The metal detector of claim 2, further comprising a tunable preselector, the tunable preselector being interconnected to the receiver coil and receiving a signal therefrom, the tunable preselector being interconnected to the controller, the controller retuning the tunable preselector whenever the discrete frequency of the frequency generator is changed.

4. The metal detector of claim 3, further comprising a pressure source, the pressure source being interconnected to the guide so as to cause the test article to move within the guide.

5. The metal detector of claim 4, wherein the pressure source supplies air to the guide.

6. The metal detector of claim 5, further comprising:
   a. a conveyor, at least a portion of the conveyor residing within the electromagnetic field radiated by the oscillator coil; and
   b. at least one valve, the valve being interconnected to the guide and to the controller, the controller causing the valve to admit pressurized air to the guide so as to move the test article based on conveyor motion and position.

7. The metal detector of claim 6, wherein the metal detector further comprises:
   a. a plurality of oscillators, each oscillator generating a signal at a discrete frequency;
   b. a plurality of signal detectors, each signal detector being capable of sensing phase and amplitude charactersitics of a signal corresponding to one of the signals generated by one of the plurality of oscillators, wherein each of the oscillators and signal detectors operates substantially continuously and simultaneously while metal detection is being attempted by the metal detector.

8. The metal detector of claim 7, wherein the frequency generator is capable of operating at discrete frequencies between 50 kHz and 2 MHz.

9. The metal detector of claim 8, wherein the test article includes a metallic object.

10. The metal detector of claim 9, further comprising a plurality of test articles, the controller being programmed to sequentially pass each test article through the electromagnetic field.

* * * * *